United States Patent [19]

Roncone

[11] 4,079,394
[45] Mar. 14, 1978

[54] CAMERA LENS MASKS

[76] Inventor: Anthony W. Roncone, 45 Pinehurst Ave., Youngstown, Ohio 44512

[21] Appl. No.: 681,165

[22] Filed: Apr. 28, 1976

[51] Int. Cl.² ............................................. G03B 17/12
[52] U.S. Cl. .................................. 354/122; 354/125; 354/295
[58] Field of Search .............. 354/122, 125, 295, 109, 354/120, 296, 286; 350/58, 59, 60

[56] References Cited

U.S. PATENT DOCUMENTS

| | | | |
|---|---|---|---|
| 678,490 | 7/1901 | Hug | 354/295 X |
| 1,226,838 | 5/1917 | Wolber | 354/125 |
| 1,755,036 | 4/1930 | Sussman | 350/58 |
| 2,110,477 | 3/1938 | Wittel | 354/286 |
| 2,186,610 | 1/1940 | Leairtt et al. | 354/122 |
| 2,238,371 | 4/1941 | Pollock | 354/286 |
| 2,460,163 | 1/1949 | Bowen | 354/125 |
| 2,547,576 | 4/1951 | Greinchard | 354/286 X |
| 3,443,499 | 5/1969 | Gianino | 354/125 X |
| 3,940,775 | 2/1976 | Bodnar | 354/122 |

*Primary Examiner*—Edna M. O'Connor
*Attorney, Agent, or Firm*—Webster B. Harpman

[57] ABSTRACT

Camera lens masks are arranged for quick detachable engagement with a lens mount on a camera and include tubular extensions limiting the light reaching the camera lens and the film in the camera to a desired area of the film whereby a plurality of individual different exposures may be made on the same film.

7 Claims, 9 Drawing Figures

CAMERA LENS MASKS

BACKGROUND OF THE INVENTION (1) Field of the Invention:

This invention relates to lens masks attachable to a camera to mask a portion of the film in the camera and permit exposure of another portion thereof.

(2) Description of the Prior Art:

Prior devices have included apertured discs which may be rotated relative to one another to change the shape of the light passing opening as in U.S. Pat. No. 1,056,588. Another prior art device has an off center aperture with the device movable to several positions so that a number of exposures can be obtained as disclosed in U.S. Pat. No. 1,165,710. A pivoted apertured mask is seen in U.S. Pat. Nos. 2,421,746 and Pat. 3,765,416 shows a cap for a lens rockable from side to side and having half the cap forming an aperture.

This invention provides several masks which used in combination enable a negative to be subjected to a number of different exposures each in a different position thereon so as to permit for example a central large exposure of a dominant theme and a series of radially spaced circumferentially arranged smaller exposures of similar themes or the like.

SUMMARY OF THE INVENTION

Camera lens masks include tubular members arranged to pass light therethrough in an area smaller than the normal camera lens aperture and to direct the light passed by the masks to various portions of the negative in the camera to permit a plurality of different exposures on the same film negative with each of the exposures being in a different location.

DESCRIPTION OF THE PREFERRED EMBODIMENT

Figure 1:
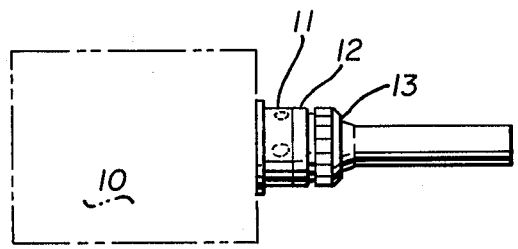
FIG. 1 is a side elevation of a schematic representation of a camera having a lens mount, a mask adaptor and a lens mask thereon.
Figure 2:
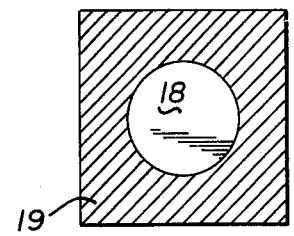
FIG. 2 is a plan view of a negative showing the area thereof exposed by the camera lens mask seen in FIG. 1.
Figure 3:
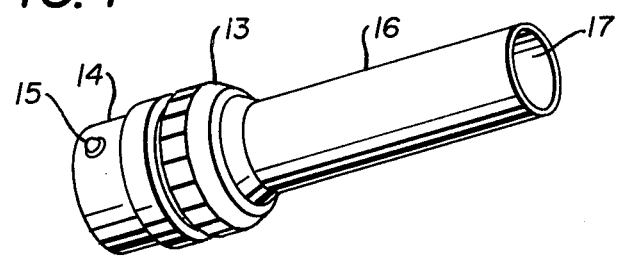
FIG. 3 is a perspective elevation of the camera lens mask seen in FIG. 1.

The camera lens masks disclosed herein are suitable for use with any camera such as indicated symbolically in FIG. 1 by the broken lines and the numeral 10. A lens mount 11 such as in a conventional camera is shown and a camera lens mask adaptor ring 12 is shown detachably secured thereto as by threadable engagement with the usual thread pattern formed in camera lens mounts as will be recognized by those skilled in the art. A quick detachable camera lens mask 13 is shown engaged in the adaptor ring 12 and by referring to FIG. 3 of the drawings it will be seen that the camera lens mask 13 takes the form of a tubular body member having a tubular extension 14 on one end thereof, the left as seen in FIG. 3, which engages the adaptor ring 12 on the camera lens mount 11 as heretofore described and is held in position therein by a spring urged detent 15 which is arranged to engage any one of a plurality of circumferentially positioned registering depressions formed in the inner surface of the adaptor ring 12. The opposite end of the lens mask 13 has an elongated secondary tubular body 16, the inner surface 17 of which is flocked with a black material to prevent light reflection from the inner surfaces thereof. It will be seen that the diameter of the elongated tubular body 16 is considerably less than the diameter of the lens mount 13 or its tubular extension 14 so that a film exposed through the lens mask 13 will have only a central exposed area such as 18 in FIG. 2 of the drawings and the remainder of the film negative will be unexposed as indicated by the shaded area and the numeral 19 on the representation of the film negative seen in FIG. 2 of the drawings.

Figure 4:
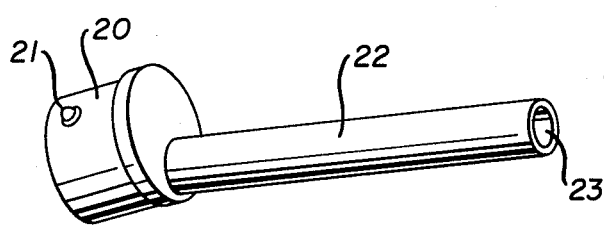
FIG. 4 is a perspective elevation of a modified form of camera lens masks.

Variations of the invention will occur to those skilled in the art and a first novel variation is seen in FIG. 4 of the drawings and by referring thereto it will be seen that a lens mask cylindrical body 20 is provided with a spring urged detent 21 which will enable it to be snap fastened in the adaptor ring 12 on the camera as seen in FIG. 1 of the drawings and heretofore described. The cylindrical body 20 is provided with a closure 21 covering a majority of its area and apertured off center and provided with an angularly disposed outwardly extending tubular body 22 in registry with the aperture therein. The inner surface of the tubular body 22 is flocked with a black flocking material as at 23 to prevent light reflection from this surface.

Figure 5:
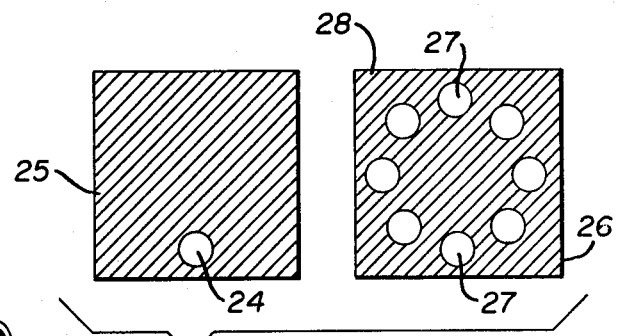
FIG. 5 is a collective illustration of two negatives showing the different areas of exposure thereon made possible by the camera lens mask of FIG. 4.

The length of the body member 20, the adaptor ring 12 and the camera lens mount 11 is such that the light passing through the tubular body 22 reaches a film negative in the camera substantially off center thereof and in a limited area as seen in the left portion of the composite view comprising FIG. 5 of the drawings and wherein the exposed area is indicated by the numeral 24 and the unexpected area of the negative is shaded and indicated by the numeral 25.

By rotating the lens masks cylindrical body 20 the angularly disposd tubular body 22 is moved to continuously different positions resulting in different light paths reaching the film negative and as seen in the right portion of FIG. 5 of the drawings a film negative 26 has a plurality of circumferentially spaced exposed areas 27 thereon forming a circular pattern about the large center area of the film negative 26. The unexposed portions of the film negative 26 are shaded and indicated by the numeral 28.

Figure 6:
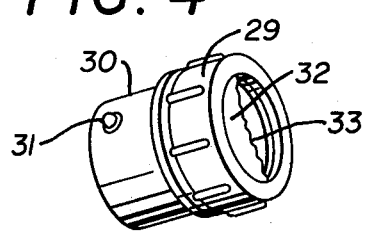
FIG. 6 is a further modification of the camera lens mask.

In FIG. 6 of the drawings a further modification of the invention may be seen and wherein the lens mask cylindrical body is indicated by the numeral 29, the tubular extension 30 thereof engagable in the adaptor ring of the camera carrying the spring urged detent 31 as in the other forms of the invention heretofore described.

The right hand end of the lens mask body 29 is provided with a half mask 32, the edge thereof forming a substantial transverse line and being irregularly shaped as indicated by the numeral 33.

Figure 7:
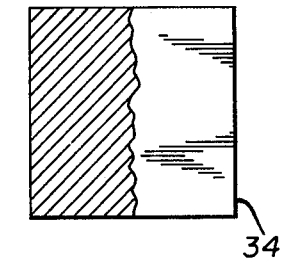
FIG. 7 is a plan view of a negative showing the exposed area thereon made possible by the mask of FIG. 6.

In FIG. 7 a film negative 34 exposed in a camera equipped with the lens mask of FIG. 6 of the drawings.

Figure 8:
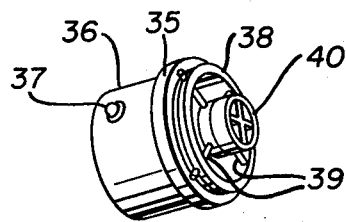
FIG. 8 is a perspective elevation of a still further modification of the camera lens mask.
Figure 9:
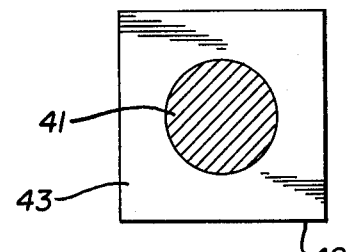
FIG. 9 is a plan view of a negative showing the portion thereof not exposed when the mask of FIG. 8 is used.

By referring now to FIG. 8 of the drawings, a still further modification may be seen wherein a cylindrical lens mask carrying body 35 is illustrated as being provided with a cylindrical extension 36 for registry with the adaptor 12 in the camera as in FIG. 1 of the drawings and carrying a spring pressed detent 37. The opposite tubular extension 38 of the cylindrical body 35 has small cross arms 39 mounting a circular mask 40 on the axial center line of the cylindrical body 35. The circular mask 40 is itself cylindrical with a closed end, the length thereof being at least equal to the diameter thereof so that it forms a light blocking mask centrally of the camera lens and results in an unexpected circular area 41 as illustrated by the shaded center section of the representation of a film negative 42 in FIG. 9 of the drawings. The remaining portion of the film negative 42 is exposed as indicated by the numeral 43.

It will occur to those skilled in the art that by utilizing the camera lens masks disclosed herein singlely or in combination unusual and novel exposures on the same negative may be made with the prints made therefrom being equally unusual. For example by utilizing the lens mask of FIGS. 1 and 3 of the drawings and exposing a central area such as at 18 in FIG. 2 of the drawings and then substituting the angularly disposed tubular body of the lens mask of FIG. 4 of the drawings and exposing a series of different scenes in a circular pattern as seen in FIG. 5 of the drawings and the left portion thereof around the earlier exposed central area as in FIG. 2 of the drawings a most unusual multiple exposed negative in individual exposure each in a different location results in a print having a central large photographic image and a plurality of circumferentially spaced radially positioned different photographic images positioned thereabout. Various other combinations and arrangements will occur to those skilled in the art as being possible with the camera lens masks disclosed herein.

Although but four embodiments of the present invention have been illustrated and described, it will be apparent to those skilled in the art that various changes and modifications may be made therein without departing from the spirit of the invention such as for example by changing the length of the tubular body members forming essential portions of the camera lens masks disclosed herein with resulting different sized and shaped and located exposed areas on a single film negative.

Having thus disclosed my invention what I claim is:

1. A camera lens mask for detachable engagement with a camera having a lens mount and an adaptor ring removably engaged therein, said mask comprising a tubular body having a tubular extension on one end thereof registrable in said adaptor ring, an elongated secondary tubular extension on the other end of said tubular body, said elongated secondary tubular extension defining a light conveying passageway of a diameter less than that of said tubular body, a non-reflective coating on the interior of said elongated secondary tubular extension whereby light passing through said camera lens mask reaches a film negative in said camera in a pattern comparable with the cross sectional shape of said elongated secondary tubular extension.

2. The camera lens mount set forth in claim 1 and wherein said elongated secondary tubular extension on said tubular body is at least double the combined length of the tubular body and the first mentioned tubular extension thereof.

3. The camera lens mask set forth in claim 1 and wherein the cross sectional shape of said elongated secondary tubular extension is circular.

4. The camera lens mask set forth in claim 1 and wherein said elongated secondary extension is angularly disposed with respect to the axial center line of said tubular body.

5. The camera lens mask set forth in claim 1 and wherein a mask of half circular shape is positioned across the outer end of said elongated secondary tubular extension and the edge thereof forming a transverse line is irregularly shaped.

6. The camera lens mask set forth in claim 1 and wherein relatively small carrying arms are positioned cross wise of the outer end of the elongated secondary tubular extension and a cylindrical masking element is carried centrally thereof and with its center on the axial center line of said tubular body.

7. The camera lens mask set forth in claim 1 and wherein a plurality of circumferentially spaced depressions are located in the inner surface of said adaptor ring and a spring pressed detent is located on said tubular extension and is registrable in any one of said circumferentially spaced depressions.

* * * * *